United States Patent
Allen et al.

[11] 3,919,255
[45] Nov. 11, 1975

[54] PRODUCTION OF 2,2-DISUBSTITUTED PROPIOLACTONES

[75] Inventors: Robert P. Allen; Jerry D. Holmes, Longview, Tex.

[73] Assignee: Eastman Kodak Company, Rochester, N.Y.

[22] Filed: Nov. 3, 1972

[21] Appl. No.: 303,551

[52] U.S. Cl. .................................... 260/343.9
[51] Int. Cl.² .................................. C07D 305/12
[58] Field of Search ....................... 260/343.9

[56] References Cited
UNITED STATES PATENTS
2,462,357  2/1949  Caldwell et al. ............ 260/343.9

*Primary Examiner*—Paul M. Coughlan, Jr.
*Assistant Examiner*—Anne Marie T. Tighe
*Attorney, Agent, or Firm*—Edward R. Weber; Cecil D. Quillen, Jr.

[57] ABSTRACT

The present invention relates to a process for the manufacture of 2,2-disubstituted propiolactones from isoanhydrides and formaldehyde, as shown in the following equation:

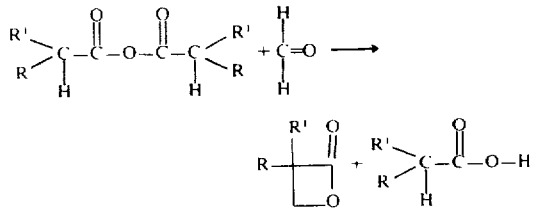

wherein R and R¹ individually may be a straight or branched chain alkyl, aryl, or aralkyl group having 1 to 10 carbon atoms. The reaction is conducted in the presence of a catalyst comprising a heteropoly acid of the type

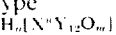

where
$X^n$ ($n$ is positive valence) = $P^5$, $As^5$, $Si^4$, $Ge^4$, $Sn^4$, $Ti^4$, $Zr^4$, $Ce^4$, or $Th^4$
$Y$ = W or Mo
$m$ = 40 or 42
$a$ = 8-n, i.e., $a$ = 3 when $n$ = 5, $a$ = 4 when $n$ = 4 supported on a suitable support, at a temperature of from about 190°C. to about 400°C.

16 Claims, No Drawings

PRODUCTION OF 2,2-DISUBSTITUTED PROPIOLACTONES

The present invention relates to a process for preparing 2,2-disubstituted propiolactones by the reaction of an isoanhydride with formaldehyde according to the following formula:

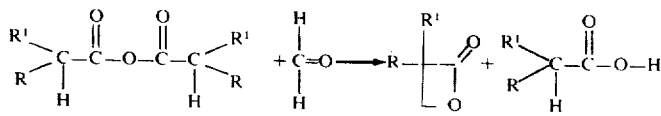

wherein R and $R^1$ individually may be a straight or branched chain alkyl, aryl or aralkyl group having 1 to 10 carbon atoms, preferably 1 to 6 carbon atoms, at a temperature of from about 190°C. to about 400°C.

2,2-Disubstituted propiolactones are useful in the polymer industry as a starting material for synthetic resins and synthetic fibers. They are also useful in the pharmaceutical industry and have heretofore been prepared by a variety of methods. For example, in U.S. Pat. No. 2,356,459, there is described a well-known method for preparing 2,2-disubstituted propiolactones by the addition reaction of dimethyl ketene and formaldehyde. The known methods for the manufacture of 2,2-disubstituted propiolactones, however, can be practiced on the commercial scale only with difficulties and resultant economic disadvantages.

It is, therefore, an object of our invention to provide a simplified method for the preparation of 2,2-disubstituted propiolactones.

It is another object to provide a one-step method for the preparation of 2,2-disubstituted propiolactones.

Other objects of the invention will become apparent from a consideration of the specification and claims of this application.

The prior literature describes a reaction of primarily aromatic aldehydes with anhydrides to give unsaturated acids. These reactions are normally conducted in the liquid phase using basic catalysts. Aliphatic aldehydes are usually unsuitable for this reaction. In the liquid phase, aldehydes normally react with anhydrides to form gem-diesters. For example, formaldehyde, when reacted with butyric anhydride, normally gives methylene dibutyrate (J. F. Walker, "Formaldehyde", 3rd Ed., ACS Monograph Series No. 152, Reinholt, p. 350). No prior literature is known which describes the condensation of aldehydes with acid anhydrides to produce lactones. It was therefore quite unexpected that formaldehyde could be made to condense in any significant amount with an anhydride to form a 2,2-disubstituted propiolactone.

In the process of the instant invention, an isoanhydride having the formula

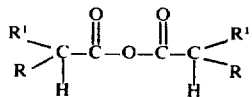

is condensed with formaldehyde to yield a 2,2-disubstituted propiolactone having the formula

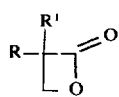

and an organic acid having the formula

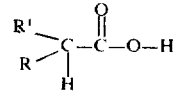

wherein R and $R^1$ individually may be a straight or branched chain alkyl, aryl or aralkyl group containing 1 to 10 carbon atoms. The reaction is catalyzed by a heteropoly acid of the type

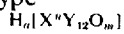

where
$X^n$ ($n$ is positive valence) = $P^5$, $As^5$, $Si^4$, $Ge^4$, $Sn^4$, $Ti^4$, $Zr^4$, $Ce^4$, or $Th^4$
$Y$ = W or Mo
$m$ = 40 or 42
$a$ = 8-n, i.e., $a$ = 3 when $n$ = 5, $a$ = 4 when $n$ = 4
deposited on a suitable support.

Typical heteropoly acids found effective in catalyzing this reaction are silicomolybdic acid, phosphomolybdic acid, germanitungstic acid, and silicotungstic acid.

A relatively low surface area (less than about 500 m²/gm) and large pore volume (greater than about 1.00 cc per gram) non-decrepitating silica gel has been found to be a highly effective support. Other silica gels and other known support materials capable of holding the heteropoly acid may be used, but are less effective. Pumice and decrepitating silica gels yielded ineffective catalysts. Non-decrepitating silica gels are defined as particulate silica gels which are physically stable when contacted with liquid water.

The heteropoly acids utilized herein as catalysts are well known in the petrochemical industry as catalysts for isomerization, dehydrogenation and oxidation reactions, but their use in condensation and cyclization reactions has not previously been disclosed. It is extremely difficult to predict the value of a catalyst for one type of reaction from its utilization in a completely different type of reaction. At times, even the characteristics of the inert support will affect the activity of the catalyst. The unpredictability of the functionality of any particular catalyst is evidenced in the present case where substitution of pumice for silica gel produced a catalyst which was totally inactive.

The catalysts of the instant invention are suitably prepared by immersing the support in an aqueous solution of the heteropoly acid or its ammonium salt, and subsequently removing the water by evaporation.

Optimum reaction conditions such as contact time, temperature, amount of diluent gas and feed composition will vary for the heteropoly acid catalysts. In general, the best results are obtained at a contact time of from about 0.5 to about 4.0 seconds, although this may vary over a much broader range, such as from about 0.1 to about 30.0 seconds.

Preferably the temperature selected will be sufficient to insure vaporization of the reactants and the products. The process may be operated at temperatures of from about 190°C. to about 400°C. A preferred temperature range is from about 200°C. to about 300°C. Subatmospheric pressure may be used to facilitate vaporization of the reactants.

Suitable anhydrides include isobutyric, 2-ethylhexanoic, 2-phenylpropionic, 2-ethylpropionic, 2-ethylbutyric, and 2-methylpentanoic.

Formaldehyde may be fed as a gaseous monomer, as a trioxane solution, or as a paraformaldehyde slurry. It has been found that the aldehyde conversion to lactone is dependent on the amount of anhydride fed. A molar ratio of from about 1.15:1 to about 10:1, preferably from about 3:1 to about 5:1 of anhydride to formaldehyde (as trioxane) in the feed mixture produces good results. The optimum ratio will depend upon various manufacturing considerations, such as refining and recycling of unreacted feed materials. There appears to be no upper limit to this ratio other than practical manufacturing considerations which arise when a large excess of one material is introduced into a system. In general, a higher anhydride to formaldehyde ratio gives higher formaldehyde conversion, but also decreases the percentage of lactone in the product.

The reaction may be carried out at atmospheric, subatmospheric, or superatmospheric pressure. If desired, an inert diluent gas may be utilized to facilitate feeding of the reactants, control of contact time, etc. Good results are obtained at atmospheric pressure using an inert diluent gas, usually in a molar ratio of gas to organic feed of from about 1:10 to about 20:1, preferably about 1:1 to 6:1, and most preferably from about 2:1 to 4:1. A suitable inert diluent gas in any gas which does not react with either the reactants or the products under the conditions of the reactions, such as $N_2$, argon, helium, gaseous hydrocarbons and compounds which are readily vaporized such as benzene.

The process of the invention is illustrated in greater detail by the following examples which are all conducted at atmospheric pressure, but it will be understood that these examples are not intended to limit the invention in any way, and obvious modifications will occur to those skilled in the art.

EXAMPLE 1

This example illustrates the preparation of a 12-molybdosilicic acid catalyst and serves to show its usefulness in the process. To a solution of 12-molybdosilicic acid (10.0 grams) in 800 ml. of water is added 7–10 mesh Davison G-59 silica gel (100 grams) [Davison G-59 is a non-decrepitating silica gel having a surface area of about 340 sq.m./gm. and a pore volume of about 1.15 cc./gm.]. The mixture is allowed to equilibrate at room temperature for 24 hours and evaporated to dryness on a steam bath to yield bright yellow granules. The catalyst (100 ml.) is charged to a 2-foot by 22 mm. Vycor reactor, heated to 300°C. in air for 20 hours, and then cooled to 230°C. under nitrogen. The Vycor reactor containing the catalyst, which is now blue-green in color, is fed an organic vapor mixture of formaldehyde and isobutyric anhydride such that the ratio of anhydride to formaldehyde is 4.4 to 1. The vapor is diluted 2.4 to 1 with nitrogen before the mixture is added to the reactor. This gives a contact time of 2.6 seconds. Over a one hour period formaldehyde conversion to pivalolactone is 58 percent. G-59 silica gel by itself gives a 6% conversion.

EXAMPLE 2

This example demonstrates the preparation of a 12-molybdophosphoric acid catalyst and its use in the process. In a manner similar to that of Example 1, 12-molybdophosphoric acid (10 grams) is deposited on 7–10 mesh Davison G-59 silica gel (100 grams) to yield blue-green granules. The catalyst (50 ml.) is charged to the Vycor reactor of Example 1, heated to 300°C. in air for 16 hours, and then cooled to 230°C. under nitrogen. The reactor containing the catalyst, which is now black in color, is fed an organic vapor mixture of toluene, formaldehyde, and isobutyric anhydride such that the ratio of anhydride to formaldehyde is 5 to 1. The vapor is diluted 4 to 1 with nitrogen. The contact time is 2 seconds. Over a 6 hour period formaldehyde conversion to pivalolactone is 29 percent.

EXAMPLE 3

This example illustrates the preparation of a 12-tungstosilicic acid catalyst and its use in the process. In a manner similar to that of Example 1, 12-tungstosilicic acid (30 grams) is deposited on 7–10 mesh Davison G-59 silica gel (100 grams) to yield colorless granules. The catalyst (50 ml.) is charged to the Vycor reactor of Example 1 and heated to 240°C. in nitrogen for 16 hours. The reactor is fed an organic solution of 4 to 1 isobutyric anhydride to formaldehyde (as trioxane) and sufficient nitrogen to produce a 2.6 to 1 nitrogen to organic ratio. Contact time is 2.8 seconds. Over a 5 hour period formaldehyde conversion to pivalolactone is 57 percent.

EXAMPLE 4

To a solution of 12-tungstosilicic acid (5.2 grams) in 400 ml. of acetone is added 7–10 mesh pumice (52 grams). The mixture is allowed to equilibrate at room temperature for 24 hours and evaporated to dryness on a steam bath to yield light brown granules. The catalyst is then dried further under reduced pressure at room temperature to yield gray granules. The catalyst (100 ml.) is charged to the Vycor reactor of Example 1, heated to 235°C. under nitrogen, and fed an organic vapor mixture of isobutyric acid, formaldehyde, and isobutyric anhydride such that the ratio of anhydride to formaldehyde is 5:1. The vapor is diluted 2.6:1 with nitrogen and over a 2 hour period formaldehyde conversion to pivalolactone is 3 percent. Untreated pumice under similar conditions gives a formaldehyde conversion of 1 percent.

EXAMPLE 5

To a solution of 12-tungstosilicic acid (5.4 grams) in 300 ml. of water is added 7–10 mesh Carborundum CHT (100 grams). The mixture is allowed to equilibrate at room temperature for 24 hours and evaporated to dryness on a steam bath to yield gray granules. The catalyst (100 ml.) is charged to the Vycor reactor of Example 1, heated to 230°C. under nitrogen, and fed an organic vapor mixture of isobutyric acid, formaldehyde, and isobutyric anhydride such that the ratio of anhydride to formaldehyde is 4.7 to 1. The vapor is diluted 2.7 to 1 with nitrogen and over a 3 hour period formaldehyde conversion to pivalolactone is 4 percent. Untreated Carborundum CHT under similar conditions gives a formaldehyde conversion of 2 percent.

EXAMPLE 6

To a solution of 12-tungstosilicic acid (6.0 grams) in 300 ml. of water is added Davison G-01 silica gel (150 ml., water vapor saturated) [Davison G-01 silica gel is a decrepitating silica gel having a surface area about 720 sq.m./gm. and a pore volume of about .45 cc./gm. when dry]. The mixture is allowed to equilibrate for 72 hours at room temperature and evaporated to dryness on a steam bath to yield almost colorless granules. The catalyst (100 ml.) is charged to the Vycor reactor of Example 1, heated to 235°C. under nitrogen, and fed an organic vapor mixture of isobutyric acid, formaldehyde, and isobutyric anhydride such that the ratio of anhydride to formaldehyde is 4.7 to 1. The vapor is diluted 2.7 to 1 with nitrogen and over a 3 hour period formaldehyde conversion to pivalolactone is 10 percent. Untreated Davison G-01 silica gel under similar conditions gives a formaldehyde conversion of 12 percent.

EXAMPLE 7

To a solution of 12-tungstosilicic acid (5.8 grams) in 200 ml. of water is added Celatom (50 grams) [Celatom is a calcined diatomaceous earth]. The mixture is evaporated to dryness on a steam bath and then further dried at 80°–90°C./25 mm. for 72 hours. The catalyst (50 ml.) is charged to the Vycor reactor of Example 1, heated to 250°C. under nitrogen, and fed an organic solution of 5 to 1 isobutyric anhydride to formaldehyde (as trioxane) and sufficient nitrogen to produce a 4 to 1 nitrogen to organic ratio. The initial formaldehyde conversion to pivalolactone is 48 percent, but fell to 35 percent over 7 hours.

The invention has been described in detail with particular reference to preferred embodiments thereof, but it will be understood that variations and modifications can be effected within the spirit and scope of the invention as described hereinabove.

We claim:

1. A process for producing a 2,2-disubstituted propiolactone having the formula:

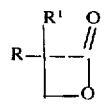

which comprises the steps of reacting an isoanhydride having the formula:

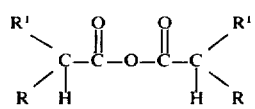

wherein R and $R^1$ individually may be straight or branched chain alkyl, having 1 to 10 carbon atoms or phenyl, with formaldehyde or a formaldehyde yielding material at a temperature of from about 190°C. to about 400°C. in the presence of a catalyst consisting essentially of an inert support selected from the group consisting of a nondecrepitating silica gel and a calcined diatomaceous earth and a heteropoly acid having the formula:

$$H_a[X^nY_{12}O_m]$$

where $X^n$ ($n$ is positive valence) = $P^5$, $As^5$, $Si^4$, $Ge^4$, $Sn^4$, $Ti^4$, $Zr^4$, $Ce^4$, or $Th^4$.

Y = W or Mo $m$ = 40 or 42

$a$ = 8-n, i.e., $a$ = 3 when $n$ = 5, $a$ = 4 when $n$ = 4.

2. The process of claim 1 wherein R or $R^1$ individually is straight or branched chain alkyl of 1 to 6 carbon atoms.

3. The process of claim 1 wherein the isoanhydride is selected from the group consisting of isobutyric anhydride, 2-ethylhexanoic anhydride, 2-phenylpropionic anhydride, 2-ethylpropionic anhydride, 2-ethylbutyric anhydride, and 2-methylpentanoic anhydride.

4. The process of claim 1 wherein the heteropoly acid is selected from the group consisting of silicomolybdic acid, phosphomolybdic acid, germanitungstic acid, and silicotungstic acid.

5. The process of claim 1 wherein the inert support consists of a non-decrepitating silica gel having a surface area of from about 200 to about 500 square meters per gram and a pore volume of from about 1.00 to about 1.50 cc. per gram.

6. The process of claim 1 wherein the reaction is conducted at a temperature of from about 200°C. to about 300°C.

7. The process of claim 1 wherein the reaction is conducted at atmospheric pressure.

8. The process of claim 1 wherein the ratio of anhydride fed to aldehyde is from about 1.15:1 to about 10:1.

9. The process of claim 8 wherein the ratio of anhydride fed to aldehyde is from about 3:1 to about 5:1.

10. A process for producing pivalolactone wherein isobutyric anhydride and formaldehyde or a formaldehyde yielding material are reacted at a temperature of from about 190°C. to about 400°C. in the presence of a catalyst consisting essentially of an inert support selected from the group consisting of a non-decrepitating silica gel and a calcined diatomaceous earth and a heteropoly acid having the formula:

$$H_a[X^nY_{12}O_m]$$

where $X^n$ ($n$ is positive valence) = $P^5$, $As^5$, $Si^4$, $Ge^4$, $Sn^4$, $Ti^4$, $Zr^4$, $Ce^4$, or $Th^4$ Y = W or Mo $m$ = 40 or 42

$a$ = 8-n, i.e., $a$ = 3 when $n$ = 5, $a$ = 4 when $n$ = 4.

11. The process of claim 10 wherein the heteropoly acid is selected from the group consisting of silicomolybdic acid, phosphomolybdic acid, germanitungstic acid, and silicotungstic acid.

12. The process of claim 10 wherein the inert support consists of a non-decrepitating silica gel having a surface area of from about 200 to about 500 square meters per gram and a pore volume of from about 1.00 to about 1.50 cc. per gram.

13. The process of claim 10 wherein the reaction is conducted at a temperature of from about 200°C. to about 300°C.

14. The process of claim 10 wherein the reaction is conducted at atmospheric pressure.

15. The process of claim 10 wherein the ratio of anhydride fed to aldehyde is from about 1.15:1 to about 10:1.

16. The process of claim 15 wherein the ratio of anhydride fed to aldehyde is from about 3:1 to about 5:1.

* * * * *